(12) United States Patent
Mohindra

(10) Patent No.: US 9,235,280 B1
(45) Date of Patent: Jan. 12, 2016

(54) MUTUAL CAPACITANCE LARGE PANEL PHASE SHIFT MITIGATION

(75) Inventor: Rishi Mohindra, Milpitas, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 162 days.

(21) Appl. No.: 13/480,395

(22) Filed: May 24, 2012

(51) Int. Cl.
*G06F 3/045* (2006.01)
*G06F 3/044* (2006.01)
*G06F 3/041* (2006.01)

(52) U.S. Cl.
CPC .............. *G06F 3/041* (2013.01); *G06F 3/044* (2013.01); *G06F 3/045* (2013.01)

(58) Field of Classification Search
None
See application file for complete search history.

(56) References Cited

U.S. PATENT DOCUMENTS

| | | | | |
|---|---|---|---|---|
| 5,526,294 | A * | 6/1996 | Ono et al. | 708/143 |
| 8,605,054 | B2 * | 12/2013 | Krenik et al. | 345/174 |
| 2007/0109274 | A1 * | 5/2007 | Reynolds | 345/173 |
| 2009/0009483 | A1 | 1/2009 | Hotelling | |
| 2010/0060589 | A1 | 3/2010 | Wilson | |
| 2010/0060593 | A1 | 3/2010 | Krah | |
| 2011/0055305 | A1 * | 3/2011 | Matsushima | 708/400 |
| 2011/0234508 | A1 * | 9/2011 | Oda et al. | 345/173 |
| 2011/0298479 | A1 * | 12/2011 | Matsushima | 324/658 |
| 2012/0056841 | A1 * | 3/2012 | Krenik et al. | 345/174 |
| 2012/0268142 | A1 * | 10/2012 | Kremin et al. | 324/658 |
| 2013/0176271 | A1 * | 7/2013 | Sobel et al. | 345/174 |
| 2013/0176274 | A1 * | 7/2013 | Sobel et al. | 345/174 |

OTHER PUBLICATIONS

U.S. Appl. No. 13/480,357, filed May 24, 2012 entitled "Hadamard Matrix Based Projected Mutual Capacitance Touch Panel Decoding".
U.S. Appl. No. 13/480,414, filed May 24, 2012 entitled "Digital Filtering and Spread Spectrum Based Interference Mitigation for Mutual and Self Capacitance Panel".
U.S. Office Action dated Jan. 18, 2014 in U.S. Appl. No. 13/480,357.
U.S. Final Office Action dated Jun. 26, 2014 in U.S. Appl. No. 13/480,357.
U.S. Notice of Allowance dated Nov. 7, 2014 in U.S. Appl. No. 13/480,357.
U.S. Office Action dated Feb. 5, 2014 in U.S. Appl. No. 13/480,414.
U.S. Final Office Action dated Jul. 14, 2014 in U.S. Appl. No. 13/480,414.
U.S. Notice of Allowance dated Oct. 23, 2014 in U.S. Appl. No. 13/480,414.

* cited by examiner

*Primary Examiner* — Srilakshmi K Kumar
*Assistant Examiner* — Stephen T Reed
(74) *Attorney, Agent, or Firm* — Weaver Austin Villeneuve & Sampson, LLP

(57) ABSTRACT

A method of mitigating a phase shift in a mutual capacitance touch screen panel having a plurality of row conductors intersecting with a plurality of column conductors to form a matrix of pixels, the method comprising: driving the row conductors with row drive signals formed from an excitation matrix, wherein each row in the excitation matrix is orthogonal to every other row in the excitation matrix, and the excitation matrix has a dimension larger than the matrix of pixels; sensing signals from the column conductors; and determining the mutual capacitance of the pixels using the sensed signals and an inverse of the excitation matrix. The excitation matrix can be a Hadamard matrix or a modified Hadamard matrix and can comprise a cyclic extension at the end of each row. A different region-specific phase shift can be applied to different clusters of signals.

34 Claims, 11 Drawing Sheets

```
-1  1 -1  1  1  1 -1  1 -1 -1  1 -1 -1 -1  1  1 -1 -1
 1 -1  1  1  1 -1  1 -1 -1  1 -1 -1 -1  1  1 -1 -1 -1
-1  1  1  1 -1  1 -1 -1  1 -1 -1 -1  1  1 -1 -1 -1  1
 1  1  1 -1  1 -1 -1  1 -1 -1 -1  1  1 -1 -1 -1  1 -1
 1  1 -1  1 -1 -1  1 -1 -1 -1  1  1 -1 -1 -1  1 -1  1
 1 -1  1 -1 -1  1 -1 -1 -1  1  1 -1 -1 -1  1 -1  1  1
-1  1 -1 -1  1 -1 -1 -1  1  1 -1 -1 -1  1 -1  1  1  1
 1 -1 -1  1 -1 -1 -1  1  1 -1 -1 -1  1 -1  1  1  1 -1
-1 -1  1 -1 -1 -1  1  1 -1 -1 -1  1 -1  1  1  1 -1  1
-1  1 -1 -1 -1  1  1 -1 -1 -1  1 -1  1  1  1 -1  1 -1
 1 -1 -1 -1  1  1 -1 -1 -1  1 -1  1  1  1 -1  1 -1 -1
-1 -1 -1  1  1 -1 -1 -1  1 -1  1  1  1 -1  1 -1 -1  1
-1 -1  1  1 -1 -1 -1  1 -1  1  1  1 -1  1 -1 -1  1 -1
-1  1  1 -1 -1 -1  1 -1  1  1  1 -1  1 -1 -1  1 -1 -1
 1  1 -1 -1 -1  1 -1  1  1  1 -1  1 -1 -1  1 -1 -1 -1
 1 -1 -1 -1  1 -1  1  1  1 -1  1 -1 -1  1 -1 -1 -1  1
-1 -1 -1  1 -1  1  1  1 -1  1 -1 -1  1 -1 -1 -1  1  1
-1 -1  1 -1  1  1  1 -1  1 -1 -1  1 -1 -1 -1  1  1 -1
```

Time (18 chips)
Inverse Matrix (0 to 1, 16-bits)

Time (20 chips)

MUTUAL CAPACITANCE LARGE PANEL PHASE SHIFT MITIGATION

FIELD OF THE INVENTION

The present invention relates to the field of touch screens. More specifically, the present invention relates to phase shift mitigation for touch screens.

BACKGROUND OF THE INVENTION

Many modern electronic devices incorporate a touch screen to display information and as an input that is activated by touching the display. One technology for implementing the touch aspect of a touch screen is capacitance sensing. An insulator, such as glass, is coated with a transparent conductor, such as indium tin oxide (ITO). Since the human body is an electrical conductor, when a finger actuates the touch screen, such as by touching or even getting very close to its surface, the electrostatic field of the touch screen is distorted, resulting in a measurable change in capacitance.

A mutual capacitance touch screen comprises two layers of material arranged in an X-Y grid such that an actuation of the touch screen can be resolved into a coordinate. A finger is typically larger than the spacing of X-Y grid lines in the layers of a mutual capacitance touch screen. Thus, multiple grid lines can be activated at different signal levels during a single actuation of the touch screen. A capacitive touch screen controller is able to resolve the signals on the X-Y multiple grid lines into an X-Y coordinate. Multiple signals are injected in parallel onto the row ITO traces and sensed in parallel at the column ITO traces. Mutual capacitance between rows and columns is affected by the proximity of fingers and conductive bodies. A touch screen controller decodes the coordinates of a touch upon the screen by repetitively scanning the touch screen sense lines in response to stimulation of the drive lines in accordance with an excitation matrix, E. The excitation matrix E has order M×N where M is the number of drive lines (rows) and N is the number of sense lines (columns) in the touch screen.

In one example, a touch screen has 20 drive lines (M) and 15 sense lines (N). A vector of output voltages Y is measured at each sense line. The order of vector Y is M, the number of columns. To decode the coordinates of a touch based upon capacitance at an intersection of a drive line and a sense line, it is necessary to determine the capacitance of each column vector X, given the vector of measured voltages Y. X is also a vector of order M. The excitation matrix, E, the vector of capacitances for a sense line, X, and the vector of voltages measured at a sense line, Y, are related by the equation E*X=Y, which is represented dimensionally as:

$$\begin{bmatrix} E_{1,1} & \cdots & E_{1,N} \\ \vdots & \ddots & \vdots \\ E_{M,1} & \cdots & E_{M,N} \end{bmatrix} \cdot \begin{bmatrix} X_1 \\ \cdots \\ X_M \end{bmatrix} = \begin{bmatrix} Y_1 \\ \vdots \\ Y_M \end{bmatrix}$$

In order to find the vector of capacitances X, we must find the inverse of the matrix, E, indicated by $E^{-1}$, and multiply it by the vector of measured voltages Y, as shown in the equation $X=E^{-1}*Y$. However, not every matrix can be inverted. Additionally, the condition number of the excitation matrix is important, since a high condition number will result in the amplification of errors and a less perfect estimation of the capacitance values. Generally, the excitation matrices in the prior art do not have condition numbers lower than two. As the condition number of the excitation matrix increases, the signal-to-noise ratio (S/N) deteriorates.

In a mutual capacitance touch screen panel with cross bar ITOs, horizontal row ITO traces are typically very broad and are orthogonally placed under narrow vertical column ITO traces. The vertical-to-horizontal size aspect ratio of mutual capacitance rectangular touch screen panels is related closely to the ratio of rows to columns, and is generally in the 2:1 to 3:1 range. FIG. 1 illustrates a touch screen panel 100 with more horizontal rows than vertical columns. The rows are driven by corresponding amplifiers 110. It is preferable to have more rows than columns, since each vertical column ITO requires a dedicated analog-to-digital converter (A/D) 120 and these A/Ds 120 are expensive in terms of both silicon die area as well as power consumption. The rows require a lower power and much smaller area driver amplifiers. Having more rows than columns is acceptable for smaller panels, even though the phase shift of the excitation signals varies much more over the column pixels than the phase shift over the row pixels, as seen in FIGS. 3A and 3B, which illustrate the phase shift over rows and columns, respectively, of a touch screen panel. In FIG. 3A, the phase shift over the rows of the touch screen panel is indicated by line 310A. In FIG. 3B, the phase shift over the columns of the touch screen panel is indicated by line 310B. Large phase shifts over the column (e.g., greater than 10 degrees) reduce the S/N of the decoded touch profile. The phase shift in the row direction can more easily be compensated by appropriate delays in the down converter sine wave signal than in the column direction, where the phase shift cannot be compensated.

In large panels, the phase shift over the column trace exceeds acceptable limits. One solution is for the large panel to be configured with a 90-degree rotation (i.e., with many more columns than rows) in order to keep the length of the columns small enough so that the phase shift over the columns is within acceptable limits. FIG. 2 illustrates a touch screen panel 200 with more columns than rows. In FIG. 3A, the phase shift over the rows of this rotated touch screen panel is indicated by dotted line 320A. In FIG. 3B, the phase shift over the columns of the rotated touch screen panel is indicated by dotted line 320B. As seen in FIG. 3B, the phase shift over the columns of the rotated touch screen panel, indicated by dotted line 320B, is less than the phase shift over the columns of the non-rotated touch screen panel, indicated by line 310B. Unfortunately, since there are more columns than rows in the rotated configuration, more A/Ds and low-noise amplifiers (LNAs) are being used, which results in the touch controller chip being more expensive, as well as a significant increase in power consumption and silicon die area.

FIG. 4 illustrates a prior art touch screen system 400, which involves exciting the rows of a mutual capacitance touch panel matrix F, 420, with an R×R excitation matrix E, 410. Panel matrix F has R rows and C columns, wherein R>=C. Each column of panel F is dot-multiplied with one selected column of excitation matrix E, which is carried out by row amplifiers 415 driving the row ITOs of the panel F. The process is repeated sequentially every chip time interval k for each column of excitation matrix E. The successive chip time intervals are labeled by k=1 to R. The row elements of the excitation matrix E, which are either 1 or −1, are multiplied with a sine-wave carrier signal 425. There are an integer number of sine wave cycles per chip time interval. The carrier signal is used to frequency translate the signal to a high frequency (e.g., ~50-500 kHz) in order to have low correlation with low frequency interference from an underlying LCD panel and battery chargers. The panel 420 comprises a crossbar two-layer configuration of ITO rows and columns. Proximity of a finger changes the mutual capacitance between rows and columns in the vicinity of the finger. The detection of the change in this mutual capacitance is usually in the 1-5% range of the mutual capacitance at the cross-point. The mutual capacitance change relative to the total capacitance is much smaller. The column ITOs are each sensed with a charge-coupled LNA 430, whose output is mixed with the original carrier sine wave and then integrated-and-dumped at the integrate-and-dump block 435 for each period of the excitation row-signal output. The integrated-and-dumped output is then collected into a matrix L, 440, with R rows and C columns. Each column output of the panel is the sum of the row signals affecting the particular column. The $c^{th}$ column signal at the $k^{th}$ chip interval that is stored in matrix L at L(k,c) is given by Equation 1 below. For simplification of this discussion, multiplication of E by the carrier sine wave is omitted from the equation. The range of c is 1 to R, and if C<R, then the panel F is taken as zero for F(r,c) where c>C.

$$L(k,c)=F(1,c)*E(1,k)+F(2,c)*E(2,k)+F(3,c)*E(3,k)+\ldots+F(R,c)*E(R,k).\quad\text{[Eq. 1]}$$

$$L(k,c)=\Sigma F(r,c)*E(r,k), \text{ summed over } r=1 \text{ to } R.$$

$$L(k,c)=\Sigma E'(k,r)*F(r,c), \text{ summed over } r=1 \text{ to } R, \text{ where } E'(k,r)=\text{transpose of } E(r,k).$$

Using general matrix multiplication notation Y=A*B, where element $Y(i,j)=\Sigma[A(i,n)*B(n,j)]$ summed over n, $$L=E'*F,\quad\text{[Eq. 2]}$$

where L=L(k,c) is the received column matrix,

E' is the transpose of E=E(r,k) that is the transmitted Excitation matrix, and

F=F(r,c) is the panel mutual capacitance matrix.

The final column signal L is actually obtained by demodulating with the carrier sine wave followed by an integrate-and-dump operation. To obtain the panel mutual capacitance matrix F, from Equation 2, $$F=\text{inv}(E')*L.\quad\text{[Eq. 3]}$$

Values of E are chosen for the lowest constant column-sum while keeping E invertible, with a low condition number and with a low RMS and Peak Error for F per Equation 2, using fixed-point simulation including fixed-point elements of inv (E). Usually the columns of excitation matrix E are cyclically shifted versions of the $1^{st}$ column If the panel is fully uniform, i.e., all elements in F(r,c) are equal to a constant β, and the variation in F(r,c) is only 1-5% with touch, then Equation 1 is approximately the column-sum of E for the $c^{th}$ column, multiplied by constant β*T where T is the integration period. Even though E is chosen for the smallest column-sum, the dynamic range of the A/Ds 437, which are positioned after the integrate-and-dump blocks 435, can be improved by having the column-sum equal to zero. This is done by subtracting a constant 'd*β*T' from the column signal:

$$L2=L-d*\beta*T=E'*F-d*\beta*T, \text{ where } d=-\text{sum(any column of } E\text{)}.\quad\text{[Eq. 4]}$$

From above, $$F=\text{inv}(E')*L2-d*\beta*T*\text{inv}(E'), \text{ and}$$

$$F=\text{inv}(E')*L2-D, \text{ where } D=d*\beta*T*\text{inv}(E') \text{ is a constant } R\times C \text{ matrix.}$$

The value of D is not computed directly since it cancels out in the baseline correction for computing the finger image profile Fp (given below for the $f^{th}$ frame):

$$Fp=F-B, \text{ where } B=\text{mean}(F \text{ without finger}) \text{ taken over many frames.}$$

$$Fp=(\text{inv}(E')*L2-D)-\text{mean}[\text{inv}(E')*L2(\text{without finger})-D].$$

$$Fp=\text{inv}(E')*L2-\text{mean}[\text{inv}(E')*L2(\text{without finger})].\quad\text{[Eq. 5]}$$

As seen in Equation 5, the finger profile is extracted without actually computing the value of D.

Referring back to FIG. 4, the matrix L is pre-multiplied by the inverse of E, 450, to produce the panel mutual capacitance matrix F, 460. The value of F is averaged when there is no finger in the proximity in order to compute the baseline B. When elements (i.e., pixels) in F are detected with significant deviation from their corresponding baseline values, the presence of a finger is assumed. In this case, the baseline B is subtracted from the current matrix F to produce the finger image profile Fp=F−B. The matrix Fp is further processed (both spatially and temporally) to track fingers and possibly reduce interference (e.g., by temporal pixel filtering over frames of Fp).

The prior art uses non-orthogonal excitation matrices in order to keep the row-sum constant. For fast baseband signaling (carrier frequency=0, and Excitation bits are sent without gaps between successive bits in order to achieve high frame rate), when phase shift occurs over the columns, the inverse matrix multiplication that is used for extracting the touch image profile from the captured column matrix no longer operates on the correct time aligned elements in the column matrix. These misalignments or time shifts produce bleeding of touch data of column pixels into each other, and therefore result in an increase in the artificial noise floor, not related to thermal and quantization noise, but related to intersymbol interference (ISI). The problem is exacerbated by finite precision and high condition numbers of the inverse matrix multiplier. For lower speed signaling with gaps between Excitation matrix bits and for non-zero carrier frequency, the down conversion mixing that is common to the entire column significantly reduces the gain of the row signals with large phase shifts over the column, which degrades the thermal and quantization S/N for those pixels. FIG. 5A illustrates one example of a non-orthogonal 18-by-18 excitation matrix with cyclically shifted columns FIG. 5B illustrates a graphical representation of the values for the excitation matrix of FIG. 5A. FIG. 5C illustrates a graphical representation of the values for the inverse of the excitation matrix of FIG. 5A. The use of a non-orthogonal matrix results in a large inter-code interference (ICI) with a relative shift between rows. Additionally, the condition number of a non-orthogonal excitation matrix is greater than one. As a result, a non-orthogonal matrix produces a poor S/N for large panels.

Another impact of the phase shift over the column is that the sum of rows for each column is no longer constant, and can become very large for a large panel. As a result, the DC cancellation is not effective, and the dynamic range of the A/Ds has to be increased by several bits.

What is needed in the art is a way to improve the performance of mutual capacitance touch screen controllers with respect to excessive phase shifts caused by large panels, while avoiding the 90-degree panel rotation used in the prior art. As discussed above, although the 90-degree panel rotation allows a lesser number of rows than columns, and therefore smaller column lengths, this result is achieved at the expense of increased power and silicon die area in the touch screen controller.

SUMMARY OF THE INVENTION

The present invention obviates the need to rotate large panels by 90 degrees for phase shift mitigation. As a result, the present invention allows the usage of the preferred configuration where there are many more row driver amplifiers than column A/Ds, which reduces the die area and power consumption of touch controller integrated circuits significantly. By using the innovative digital signal processing methodology of the present invention, the touch screen system is able to cope with extremely large phase shifts over the columns For high-speed baseband signaling, the present invention mitigates the problems discussed above by using orthogonal-based row signaling with a cyclical extension of the excitation matrix in the time dimension in order to maintain full relative orthogonality of each of the row drive signals, independent of the panel phase shift. In some embodiments, the orthogonal-based signaling involves the use of a Hadamard matrix as the excitation matrix. In some embodiments, the present invention uses a modified Hadamard matrix that is the dot product of a Hadamard matrix with a cover code matrix. The present invention also includes clustering a large panel into phase shift regions for digitally de-correlating and decoding signals. These features improve the panel signal processing and help ensure immunity to panel phase shifts, thereby enabling usage of large touch screen panels that have excessive phase shifts that cannot be handled by the prior art due to unacceptable levels of ICI, while avoiding the 90-degree rotation of the large panel and the increase in power consumption and die area associated with it.

In one aspect of the present invention, a touch screen controller for a mutual capacitance touch screen panel is provided. The touch screen panel has a plurality of row conductors intersecting with a plurality of column conductors to form a matrix of pixels, with each pixel configured to have a mutual capacitance. The touch screen controller comprises: a transmitting unit configured to drive the row conductors with row drive signals formed from an excitation matrix, wherein each row in the excitation matrix is orthogonal to every other row in the excitation matrix, and the excitation matrix has a dimension larger than the matrix of pixels; and a receiving unit configured to sense signals from the column conductors and to determine the mutual capacitance of the pixels using the sensed signals and an inverse of the excitation matrix. In some embodiments, the excitation matrix is a Hadamard matrix. In some embodiments, the excitation matrix is a modified Hadamard matrix that is the dot product of a Hadamard matrix with a cover code matrix.

In some embodiments, the excitation matrix comprises a cyclic extension at the end of each row, the cyclic extension for each row repeating a predetermined number of elements from the beginning of the row. In some embodiments, the predetermined number of elements is larger than a maximum panel delay of the touch screen panel.

In some embodiments, determining the mutual capacitance of the pixels comprises: receiving clusters of signals, wherein each signal in the clusters of signals is formed from one of the sensed signals, and each cluster of signals corresponds to a different region of pixels on the touch screen panel; and applying a different region-specific phase shift to each cluster of signals. In some embodiments, the receiving unit comprises one or more analog-to-digital converters configured to convert analog signals received from the column conductors into digital signals that form the clusters of signals prior to the application of the different region-specific phase shifts to the cluster of signals. In some embodiments, the receiving unit comprises low-noise amplifiers configured to amplify analog signals received from the column conductors and to provide the amplified analog signals to the one or more analog-to-digital converters.

In some embodiments, the transmitting unit is further configured to form the row drive signals by pulse shaping row elements of the excitation matrix. In some embodiments, the transmitting unit is configured to pulse shape the row elements of the excitation matrix with a sinusoidal waveform. In some embodiments, the sinusoidal waveform is provided by a sine wave lookup table. In some embodiments, the transmitting unit is configured to pulse shape the row elements of the excitation matrix using a raised-cosine filter.

In some embodiments, the transmitting unit is configured to use a window function in forming the row drive signals. In some embodiments, the receiving unit is configured to use a window function in determining the mutual capacitance of the pixels. In some embodiments, the transmitting unit is configured to use a cover code in forming the row drive signals.

In another aspect of the present invention, a method of mitigating a phase shift in a mutual capacitance touch screen panel is provided. The touch screen panel has a plurality of row conductors intersecting with a plurality of column conductors to form a matrix of pixels, with each pixel configured to have a mutual capacitance. The method comprises: driving the row conductors with row drive signals formed from an excitation matrix, wherein each row in the excitation matrix is orthogonal to every other row in the excitation matrix, and the excitation matrix has a dimension larger than the matrix of pixels; sensing signals from the column conductors; and determining the mutual capacitance of the pixels using the sensed signals and an inverse of the excitation matrix. In some embodiments, the excitation matrix is a Hadamard matrix. In some embodiments, the excitation matrix is a modified Hadamard matrix that is the dot product of a Hadamard matrix with a cover code matrix.

In some embodiments, the excitation matrix comprises a cyclic extension at the end of each row, the cyclic extension for each row repeating a predetermined number of elements from the beginning of the row. In some embodiments, the predetermined number of elements is larger than a maximum panel delay of the touch screen panel.

In some embodiments, determining the mutual capacitance of the pixels comprises: receiving clusters of signals, wherein each signal in the clusters of signals is formed from one of the sensed signals and each cluster of signals corresponds to a different region of pixels on the touch screen panel; and applying a different region-specific phase shift to each cluster of signals. In some embodiments, the method further comprises converting analog signals received from the column conductors into digital signals that form the clusters of signals prior to applying the different region-specific phase shifts to the cluster of signals. In some embodiments, the method further comprises: amplifying analog signals received from the column conductors using low-noise amplifiers; and providing the amplified analog signals to analog-to-digital converters for the conversion into the digital signals that form the clusters of signals.

In some embodiments, the method further comprises forming the row drive signals by pulse shaping row elements of the excitation matrix. In some embodiments, the method further comprises pulse shaping the row elements of the excitation matrix with a sinusoidal waveform. In some embodiments, the sinusoidal waveform is provided by a sine wave lookup table. In some embodiments, the method further comprises pulse shaping the row elements of the excitation matrix using a raised-cosine filter.

In some embodiments, the method further comprises using a window function in forming the row drive signals. In some embodiments, the method further comprises using a window function in determining the mutual capacitance of the pixels. In some embodiments, the method further comprises using a cover code in forming the row drive signals.

In yet another aspect of the present invention, a program storage device readable by a machine, tangibly embodying a program of instructions executable by the machine to perform a method of mitigating a phase shift in a touch screen panel is provided. The touch screen panel has a plurality of row conductors intersecting with a plurality of column conductors to form a matrix of pixels, with each pixel configured to have a mutual capacitance. The method comprises: driving the row conductors with row drive signals formed from an excitation matrix, wherein each row in the excitation matrix is orthogonal to every other row in the excitation matrix, and the excitation matrix has a dimension larger than the matrix of pixels; and determining the mutual capacitance of the pixels using signals sensed from the column conductors and an inverse of the excitation matrix. In some embodiments, the excitation matrix is a Hadamard matrix. In some embodiments, the excitation matrix is a modified Hadamard matrix that is the dot product of a Hadamard matrix with a cover code matrix.

In some embodiments, the excitation matrix comprises a cyclic extension at the end of each row, the cyclic extension for each row repeating a predetermined number of elements from the beginning of the row. In some embodiments, the predetermined number of elements is larger than a maximum panel delay of the touch screen panel.

In some embodiments, determining the mutual capacitance of the pixels comprises: receiving clusters of signals, wherein each signal in the clusters of signals is formed from one of the sensed signals, and each cluster of signals corresponds to a different region of pixels on the touch screen panel; and applying a different region-specific phase shift to each cluster of signals.

In some embodiments, the method further comprises forming the row drive signals by pulse shaping row elements of the excitation matrix. In some embodiments, the method further comprises pulse shaping the row elements of the excitation matrix with a sinusoidal waveform. In some embodiments, the sinusoidal waveform is provided by a sine wave lookup table. In some embodiments, the method further comprises pulse shaping the row elements of the excitation matrix using a raised-cosine filter.

In some embodiments, the method further comprises using a window function in forming the row drive signals. In some embodiments, the method further comprises using a window function in determining the mutual capacitance of the pixels. In some embodiments, the method further comprises using a cover code in forming the row drive signals.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown but is to be accorded the widest scope consistent with the principles and features described herein.

The present invention can be provided as a computer program product that can include a machine-readable medium having stored thereon instructions that can be used to program a computer (or other electronic devices) to perform a process according to the present invention. The machine-readable medium can include, but is not limited to, floppy diskettes, optical disks, CD-ROMs, ROMs, RAMs, magnet or optical cards, or other type of media/machine-readable medium suitable for storing electronic instructions.

Furthermore, it is contemplated that any features from any embodiment can be combined with any features from any other embodiment. In this fashion, hybrid configurations of the illustrated embodiments are well within the scope of the present invention.

Various aspects of the disclosure can be described through the use of flowcharts. Often, a single instance of an aspect of the present disclosure can be shown. As is appreciated by those of ordinary skill in the art, however, the protocols, processes, and procedures described herein can be repeated continuously or as often as necessary to satisfy the needs described herein. Additionally, it is contemplated that method steps can be performed in a different order than the order illustrated in the figures, unless otherwise disclosed explicitly or implicitly.

In accordance with the principles of the present invention, a preferred excitation matrix has a low, non-zero condition number and the output produced at each column sense line using the excitation matrix is constant across all sense lines so that the required dynamic range of amplifiers at the sense lines can be minimized. The present invention uses an orthogonal matrix as the excitation matrix. A key property of an orthogonal matrix is that any two rows are 100% orthogonal, independent of their relative phase shifts. Relative phase shift refers to the circular shift of rows relative to each other. For an orthogonal matrix, the cross correlation of any two rows is zero, independent of their relative circular shift, even for non-integer relative circular shifts. Additionally, the condition number for an orthogonal matrix is equal to one. As a result of these properties, an orthogonal matrix produces a good S/N for large panels.

Figures 5A, 5B:
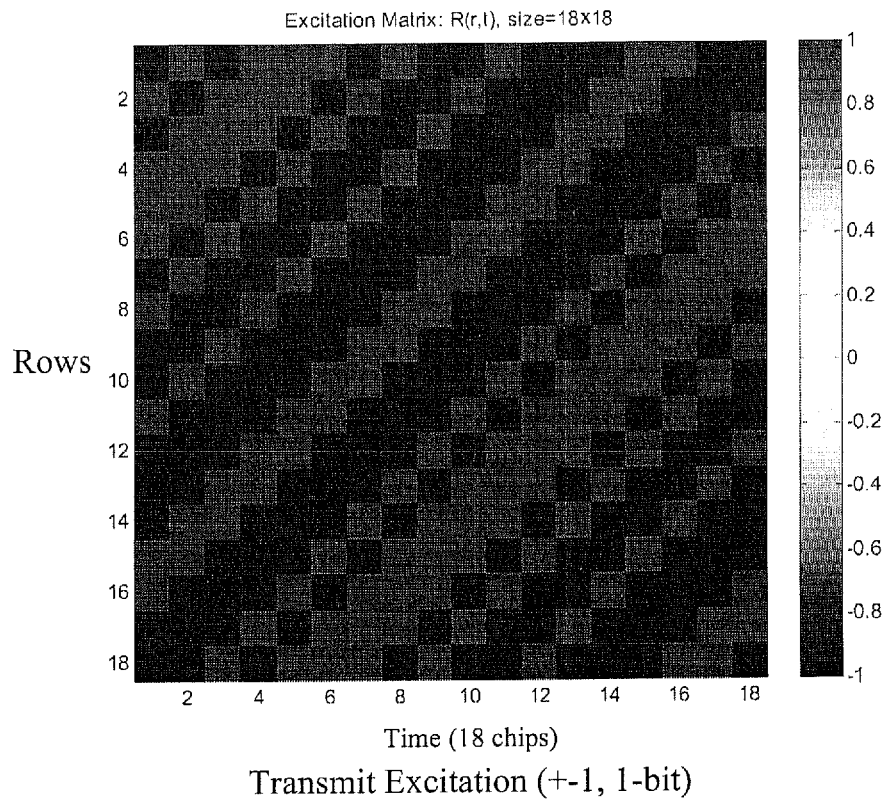
FIG. 5A illustrates a non-orthogonal matrix.
FIG. 5B illustrates a graphical representation of the values for the non-orthogonal excitation matrix of FIG. 5A.
Figure 5C:
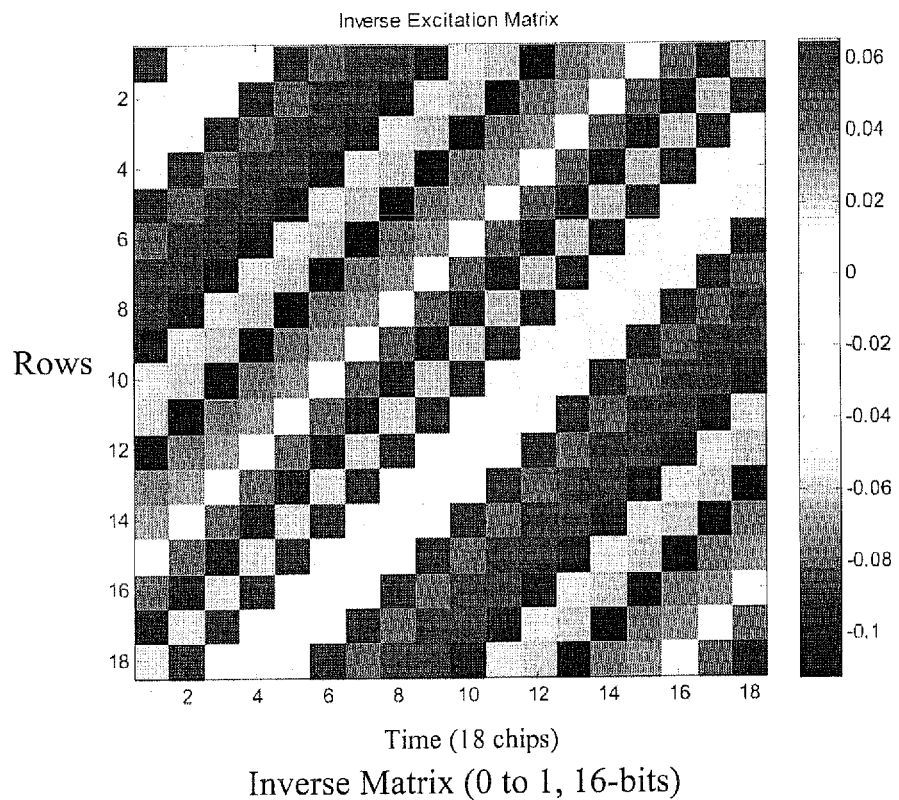
FIG. 5C illustrates a graphical representation of the values for the inverse of the non-orthogonal excitation matrix of FIG. 5A.
Figure 6A:
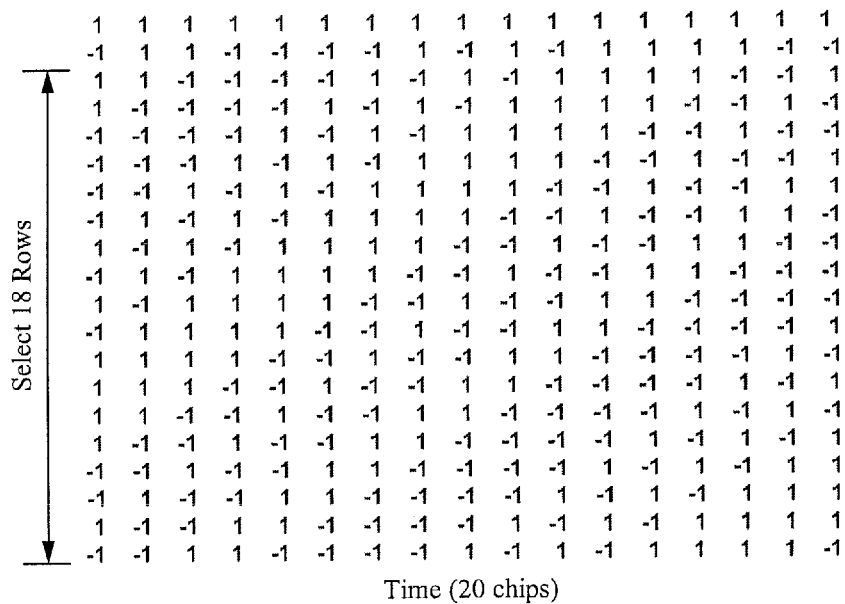
FIG. 6A illustrates an orthogonal matrix in accordance with some embodiments of the present invention.
Figure 6B:
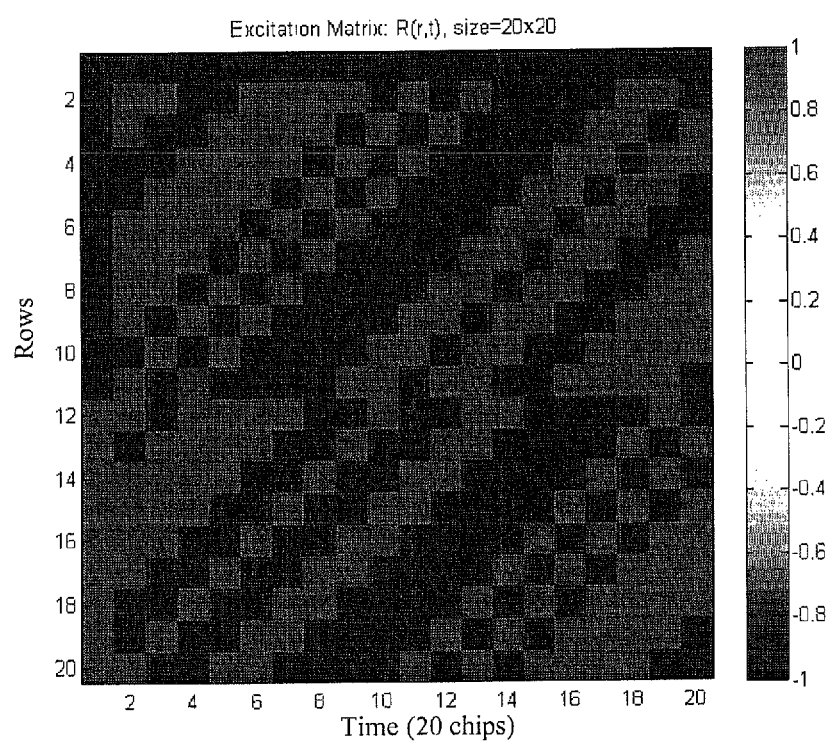
FIG. 6B illustrates a graphical representation of the values for the orthogonal excitation matrix of FIG. 6A in accordance with some embodiments of the present invention.

One type of orthogonal matrix that is particularly useful is a Hadamard matrix. FIG. 6A illustrates one example of a Hadamard matrix in accordance with some embodiments of the present invention. FIG. 6B illustrates a graphical representation of the values for the Hadamard excitation matrix of FIG. 6A in accordance with some embodiments of the present invention. The Hadamard excitation matrix comprises only 1-bit elements of either 1 or −1. The inverse of the Hadamard matrix is the same as the original Hadamard matrix, comprising only 1-bit elements of either 1 or −1, which is in contrast to the excitation matrices of the prior art (such as the excitation matrix in FIGS. 5A-C), whose inverse matrices have a 16-bit dynamic range requirement.

Typically, the rows R in a touch screen panel varies from 10 to 60. The present invention uses a Hadamard matrix whose dimension N is just larger than the number of rows R. These Hadamard dimensions are: 12, 16, 20, 24, 32, 40, 48, and 64. Any R out of N rows from the Hadamard matrix can be selected and used for the excitation matrix. For example, for a touch screen panel having 18 rows, 18 rows from a 20×20 Hadamard matrix can be used, with 2 rows of the 20×20 Hadamard matrix being discarded. The column size of the Hadamard matrix is N, which is slightly larger than the row size R, and therefore different from an R×R matrix based solution.

In some embodiments, the excitation matrix is a modified Hadamard matrix that is the dot product of a Hadamard matrix with a cover code matrix. In some embodiments, the cover code matrix is produced by repeating a particular N×1 column vector (comprised of +1's and −1's), where the Hadamard matrix and the cover code matrix are of dimension N×N. The reason for duplicating all the columns in the cover code matrix is to ensure that when a dot product is taken with the corresponding Hadamard matrix, the resultant excitation matrix is fully orthogonal with a condition number equal to 1. Below is one embodiment of an algorithm for Hadamard-based touch decoding, including the use of a cover code and offset cancellation, and shows how to search for the optimum cover code matrix for a given value of N:

```
clear all;cic;
N=16;
h=hadamard(N);
covercode=zeros(N);
sum_max=1e6;
for ii=1:2^N-1,
c=dec2bin(ii,N)';
x(c=='1')=1;
x(c=='0')=-1;
xx=repmat(x',1,N);
xh=xx.*h;
maxval=max(abs(sum(xh)));
if maxval<sum_max && maxval>0,
   sum_max=maxval;
   covercode=xx;
end;
end;
covercode
Exct=covercode.*h;
sum_cc=sum(covercode.*h)
inverse_mat=inv(covercode.*h);
scale=max(max((inv(covercode.*h))))
inverse_mat/scale
cond(inverse_mat)
%% Decoding without Offset Cancellation
if false,
[F1,F2]=meshgrid(1:N,1:N);
F=ones(N)+(F1+F2-1)*0.001% this is sloped panel profile F
L=zeros(N);
for ii=1:N,
   L(ii,:)=sum(F.*repmat(Exct(:,ii),1,N)); % received A/D signal end;
Finger_BL=inv(Exct')*L
end
%% Decoding with Offset Cancellation
if true
[F1,F2]=meshgrid(1:N,1:N);
F=ones(N)+(F1+F2-1)*0.001% this is sloped panel profile F
L=zeros(N);
for ii=1:N,
   L(ii,:)=sum(F.*repmat(Exct(:,ii),1,N));  % propagate Excitation signal over full panel at a given chip interval ii
% L(ii,:)=L(ii,:)−sum(L(ii,1)); % offset cancellation including panel variation compensation
   L(ii,:)=L(ii,:)−sum(repmat(Exct(:,ii),1,N)); % offset cancellation without compensating panel variation
end;
L
offset_matrix=−repmansum_cc,N,1)'
% L=L+offset_matrix; % already performed above at each chip interval
Finger_BL=inv(Exct')*L
end
```

As can be seen below from the sum of each column of an original 16×16 Hadamard matrix, a particular column has a maximum absolute value of 16. After multiplying the Hadamard matrix with the cover code matrix, the maximum absolute value is reduced to 4. Using a complex cover code matrix can reduce the maximum absolute value even further. The condition number is not affected by the cover code and is maintained at 1.

Hadamard Matrix:

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | −1 | 1 | −1 | 1 | −1 | 1 | −1 | 1 | −1 | 1 | −1 | 1 | −1 | 1 | −1 |
| 1 | 1 | −1 | −1 | 1 | 1 | −1 | −1 | 1 | 1 | −1 | −1 | 1 | 1 | −1 | −1 |
| 1 | −1 | −1 | 1 | 1 | −1 | −1 | 1 | 1 | −1 | −1 | 1 | 1 | −1 | −1 | 1 |
| 1 | 1 | 1 | 1 | −1 | −1 | −1 | −1 | 1 | 1 | 1 | 1 | −1 | −1 | −1 | −1 |
| 1 | −1 | 1 | −1 | −1 | 1 | −1 | 1 | 1 | −1 | 1 | −1 | −1 | 1 | −1 | 1 |
| 1 | 1 | −1 | −1 | −1 | −1 | 1 | 1 | 1 | 1 | −1 | −1 | −1 | −1 | 1 | 1 |
| 1 | −1 | −1 | 1 | −1 | 1 | 1 | −1 | 1 | −1 | −1 | 1 | −1 | 1 | 1 | −1 |
| 1 | 1 | 1 | 1 | 1 | 1 | 1 | 1 | −1 | −1 | −1 | −1 | −1 | −1 | −1 | −1 |
| 1 | −1 | 1 | −1 | 1 | −1 | 1 | −1 | −1 | 1 | −1 | 1 | −1 | 1 | −1 | 1 |
| 1 | 1 | −1 | −1 | 1 | 1 | −1 | −1 | −1 | −1 | 1 | 1 | −1 | −1 | 1 | 1 |
| 1 | −1 | −1 | 1 | 1 | −1 | −1 | 1 | −1 | 1 | 1 | −1 | −1 | 1 | 1 | −1 |
| 1 | 1 | 1 | 1 | −1 | −1 | −1 | −1 | −1 | −1 | −1 | −1 | 1 | 1 | 1 | 1 |
| 1 | −1 | 1 | −1 | −1 | 1 | −1 | 1 | −1 | 1 | −1 | 1 | 1 | −1 | 1 | −1 |
| 1 | 1 | −1 | −1 | −1 | −1 | 1 | 1 | −1 | −1 | 1 | 1 | 1 | 1 | −1 | −1 |
| 1 | −1 | −1 | 1 | −1 | 1 | 1 | −1 | −1 | 1 | 1 | −1 | 1 | −1 | −1 | 1 |

Optimum Cover Code Matrix:

| -1 | -1 | -1 | -1 | -1 | -1 | -1 | -1 | -1 | -1 | -1 | -1 | -1 | -1 | -1 | -1 |
|---|---|---|---|---|---|---|---|---|---|---|---|---|---|---|---|
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| -1 | -1 | -1 | -1 | -1 | -1 | -1 | -1 | -1 | -1 | -1 | -1 | -1 | -1 | -1 | -1 |

In some embodiments, when all N rows are not used in a touch panel, the search for the cover code is done by looking for the minimum(absolute(sum of column)) over the non-zero rows. The entries for the unused rows is "+1" in the cover code for the inverse matrix computation.

Figure 7:
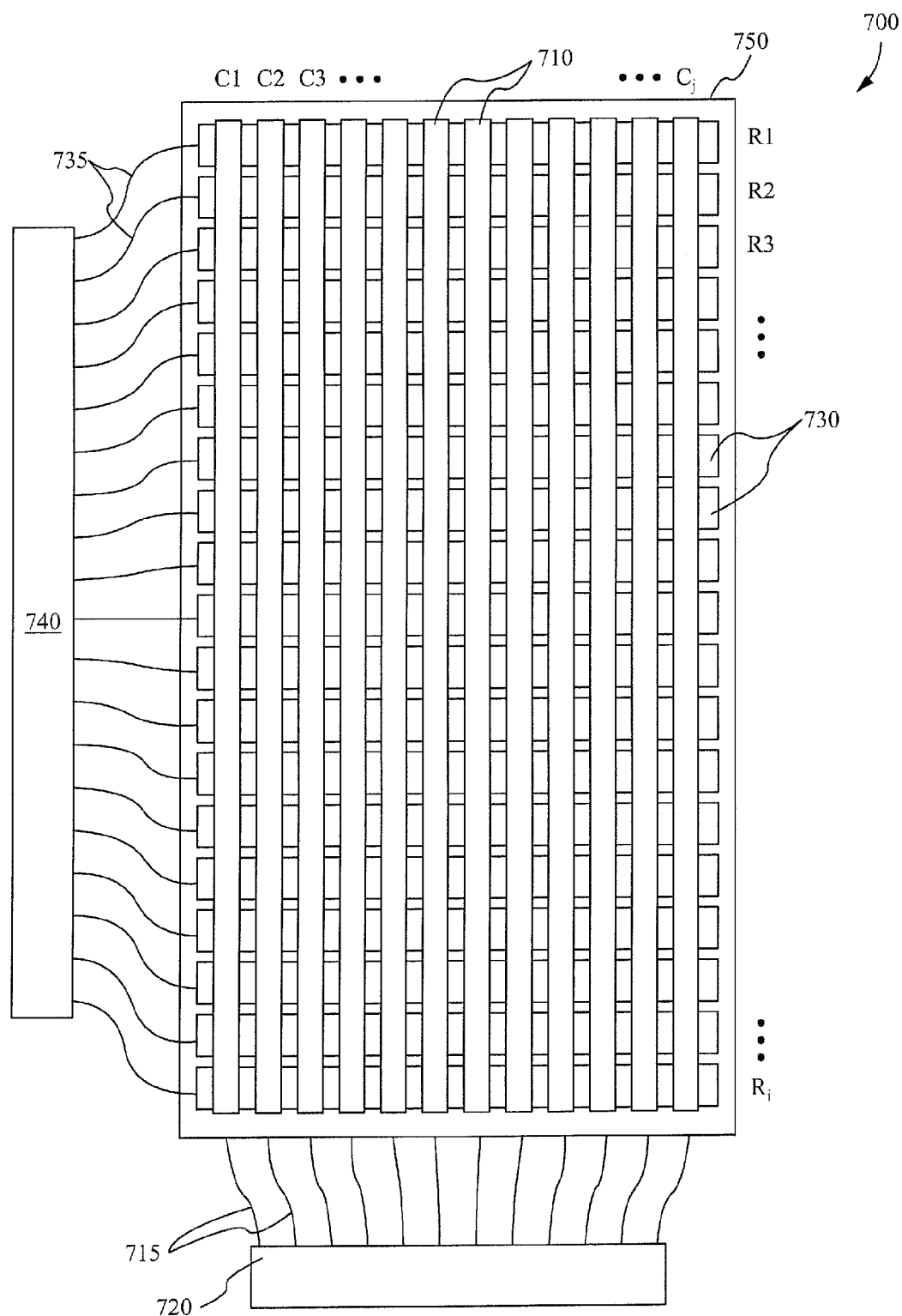
FIG. 7 illustrates a plan view of a touch screen panel in accordance with some embodiments of the present invention.

FIG. 7 illustrates a plan view of a touch screen panel 700 in accordance with some embodiments of the present invention. In a preferred embodiment, the touch screen panel 700 is a mutual capacitive touch screen display. The panel 700 comprises a display element 750 and a plurality of columns 710 and rows 730, preferably formed from transparent conductive material, such as ITO. In preferred embodiments, the signals are driven on the rows 730 and sensed on the columns 710. In some embodiments, each column 710 has a connecting wire 115 coupling the column 710 to a head connector 720 for interfacing to a touch screen controller (not shown). The plurality of columns 710 are labeled $C_1, C_2, C_3, \ldots, C_j$ for reference. Collectively, the columns are referred to as the X-axis, as is known in reference to a Cartesian plane. Similarly, in some embodiments, each row 730 is connected by a wire 735 to a second head connector 740 for interfacing to the touch screen controller. Although FIG. 7 shows the columns 710 and the rows 730 connected to separate head connectors 720 and 740, respectively, it is contemplated that the columns 710 and rows 730 can be connected to the same head connector. The plurality of rows 730 are labeled $R_1, R_2, R_3, \ldots, R_i$ for reference. Collectively, the rows are referred to as the Y-axis, as is known in reference to a Cartesian plane. One skilled in the art will recognize that the functionality of the plurality of the sense lines and the plurality of drive lines could be arranged in other orientations. FIG. 7 is shown with 12 columns and 18 rows arranged in a 12×18 grid. However, it is contemplated that other configurations are also within the scope of the present invention. Furthermore, in a preferred embodiment, the sensing columns 710 are thinner in width than the driving rows 730, and there is more distance between the columns 710 than between the rows 730. Unless otherwise specified herein, the crossing of each row and column point is termed a "pixel" of the touch screen. In this respect, the term "pixel" does not refer to a video picture element of the display. In operation, a signal is applied to the X-Y grid, preferably driven by an amplifier via rows 730. A mutual capacitance is formed between the rows and columns. When a finger is brought into close proximity of the touch screen surface, the capacitance changes. Using signal processing techniques, a controller detects these changes in the capacitance.

Figure 8:
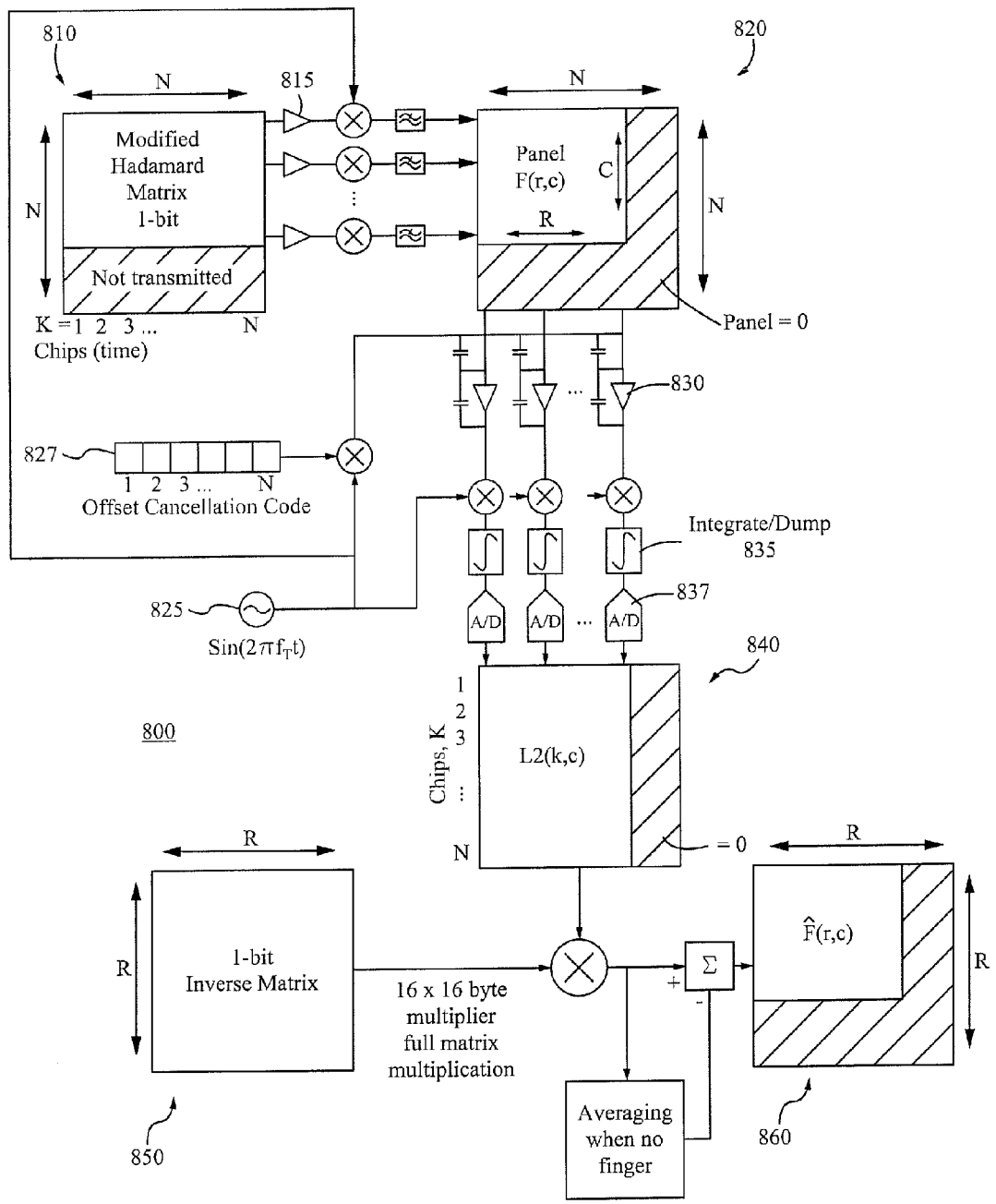
FIG. 8 illustrates one embodiment of a touch screen system in accordance with some embodiments of the present invention.

FIG. 8 illustrates one embodiment of a touch screen system 800 in accordance with some embodiments of the present invention. In touch screen system 800, excitation matrix E, 810, excites the rows of mutual capacitance touch panel matrix F, 820. Excitation matrix E is an orthogonal matrix. In some embodiments, excitation matrix E comprises a Hadamard matrix. Preferably, the excitation matrix E comprises a modified Hadamard matrix. In some embodiments, the excitation matrix 810 comprises an N×N Hadamard matrix or modified Hadamard matrix. In some embodiments, the excitation matrix comprises an orthogonal matrix other than a Hadamard matrix, such as a Walsh matrix. In some embodiments, this orthogonal matrix other than a Hadamard matrix is dot multiplied with a cover code to form a modified orthogonal matrix, similar to how the modified Hadamard matrix is produced.

In some embodiments, excitation matrix E is represented by the equation: E=H.*Cc (dot multiplication of matrices), where H is an N×N Hadamard matrix, and Cc is an N×N cover code matrix with elements of either 1 or -1 and chosen so that maximum(absolute(column_sum($E_{partial}$))) is at a minimum. $E_{partial}$ is a truncated excitation matrix. It comprises R arbitrary rows of excitation matrix E that will be used to drive the physical panel row ITOs. In a particular embodiment, the columns of Cc are identical, i.e., the same N×1 column code of Cc is used to multiply the excitation matrix row-drive N×1 vector each chip. The panel F is assumed to be of dimension N rows×N columns for the signal processing, even though the physical panel is R rows×C columns, with R and C being less than or equal to N. F is zero for rows greater than R and for columns greater than C. In some embodiments, the cover code matrix implements Binary Phase-Shift Keying (BPSK) modulation on the carrier signal. In some embodiments, the cover code matrix is not used and the excitation matrix E is represented by the equation: E=H.

In one example, touch panel 820 has 18 drive channels and 16 sense columns. Preferably, the order, N, of the excitation matrix 810 is greater than or equal to the larger of the number of drive channels (here, 18), and the number of sense columns (here, 16). In some embodiments, the modified Hadamard matrix has order 1, 2, or 4k where k is an integer greater than zero. In this example, the lowest order, N, for a modified Hadamard excitation matrix 810 meeting the foregoing criteria is N=20. For each column, $C_i$, of the modified Hadamard excitation matrix 810, the column is selected, each drive signal is fed to an amplifier 815, and the amplified selected column is preferably mixed with a sine wave 825 (e.g., a 100 KHz sine) to produce a drive signal for each of the drive channels of the touch panel 820. In some embodiments, each drive signal is filtered by a filter before feeding the drive signal to a drive channel of the touch panel 820.

In alternative embodiments, a cover code is dot multiplied with a Hadamard matrix downstream from the amplifiers 815 and upstream from the panel 820, as opposed to the cover code being used to form the modified Hadamard matrix as the excitation matrix 810. In some embodiments, the cover code is a vector of order N. The coefficients of the cover code vector are able to be 1-bit values, integers, real values, or complex values. In some embodiments, this cover code, multiplied by the sine wave 825, is also fed to the each column sense channel to demodulate the channel at a sense channel amplifier 830.

For the example touch panel 820, there are 18 drive channels and the modified Hadamard excitation matrix 810 has order 20. Thus, each selected column of the modified Hadamard excitation matrix 810 has 20 coefficients. The last two coefficients of a selected column of the modified Hadamard excitation matrix 810 are not transmitted to the touch panel 820 because there is no corresponding drive channel (e.g. 19 and 20) on the touch panel 820. Conceptually, the physical touch panel 820 exists within an N×N matrix having null values for rows greater than the touch panel 820 (here, rows 19 and 20) and null values for columns greater than the touch panel 820 (here, columns 17 through 20). Each column sense is input to an amplifier 830, mixed with the sine wave 825, integrated 835, then dumped to an analog to digital convertor 837. Resulting digital values are stored in a matrix of voltages 840. In some embodiments, a fixed delay is added to each sense line to reduce phase shift in the drive signal propagation to the sense line. The fixed delay is able to be different for each sense line. The matrix of voltages 840 has null values for the coefficients of row numbers greater than the touch panel 820 (here, rows 19 and 20) and null values for the coefficients of column numbers greater than the touch panel 820 (here, columns 17 through 20). The matrix of voltages 840 is multiplied by the inverse matrix 850 of the modified Hadamard excitation matrix 810 to obtain a matrix of panel capacitance values 860 at each drive channel and column sense intersection. When no touch is detected upon the panel, the coefficients of the capacitance matrix 860 are averaged to filter out anomalies, then the averaged coefficients are used by a summation/difference element to determine a final matrix of capacitances 860 in an N×N matrix. Alternatively, or in addition, to using averaging, a baseline phase-compensated matrix of capacitances (not shown) representing no touch upon the touch panel 820 is able to be used to determine when no touch is upon the touch panel 820. In addition, averaging can be combined with the baseline phase-compensated matrix of capacitances (not shown) to further reduce error phase shift error in the matrix of capacitance values 860. The baseline phase compensated matrix (not shown) is able to be established as a function of the model of the touch panel, as a part of a power-up sequence of a device incorporating the touch panel and decoder circuit, or as a part of a factory test sequence. Coefficients of the N×N matrix 860 corresponding to rows that are greater than the number of rows in the touch panel 820 have null values. Coefficients of the N×N matrix 860 corresponding to columns that are greater than the number of columns in the touch panel have null values.

Figure 1:
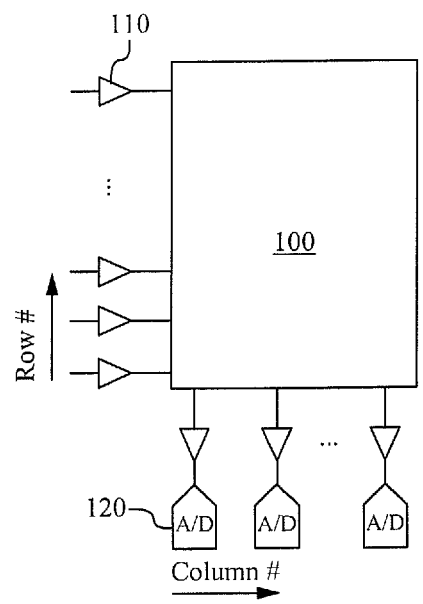
FIG. 1 illustrates a prior art touch screen panel with more rows than columns
Figure 2:
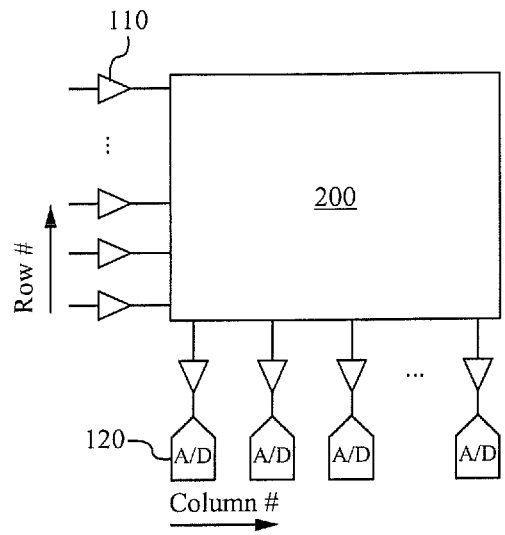
FIG. 2 illustrates a prior art touch screen panel with more columns than rows.
Figure 3A:
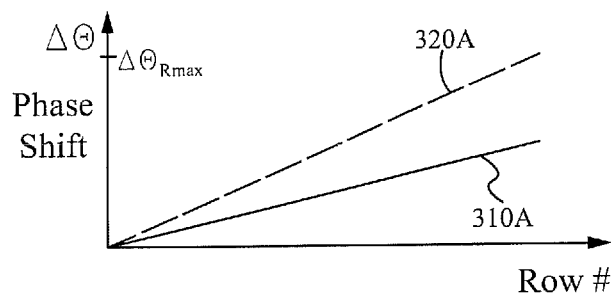
FIG. 3A is a graph illustrating the phase shift for rows of a prior art touch screen panel.
Figure 3B:
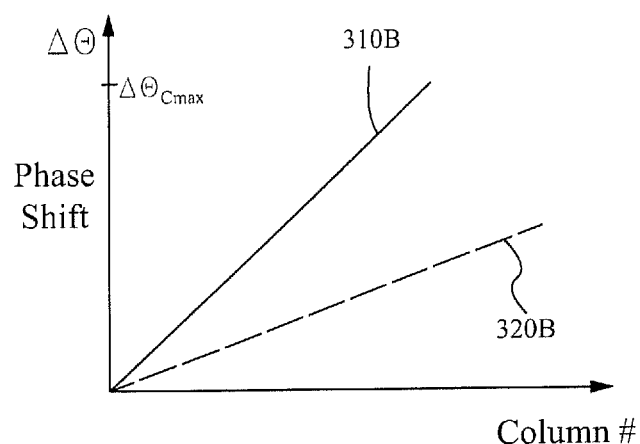
FIG. 3B is a graph illustrating the phase shift for columns of a prior art touch screen panel.
Figure 4:
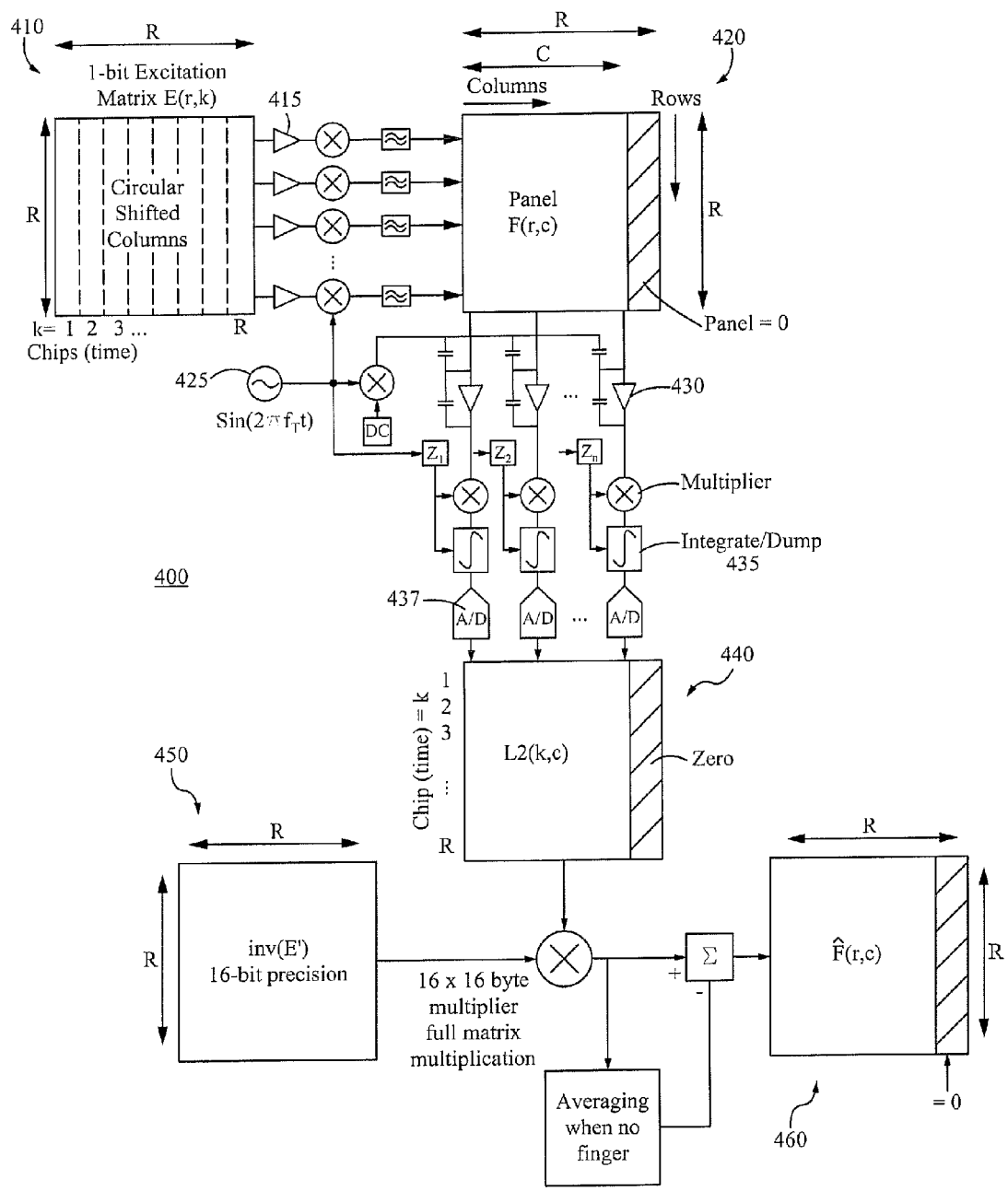
FIG. 4 illustrates a prior art touch screen system.

In some embodiments, the DC cancellation circuit at the receiver (e.g., as seen in FIG. 4) is removed, thereby simplifying the architecture and reducing the silicon die area significantly. In some embodiments, the DC cancellation at the receiver is changed with a cyclical cancellation sequence. In some embodiments, an offset cancellation code 827 is applied to the amplifiers 830. In some embodiments, the offset cancellation code 827 is individualized for each sensor, i.e., tweaked for each particular sensor for complete cancellation. In some embodiments, the offset cancellation code 827 is individualized for mean response of panel variation.

Some embodiments of the equations for the touch screen processing of the present invention are described below with respect to touch screen system 800. Preferably, each column of mutual capacitance panel F, 820, is dot-multiplied with one selected column of excitation matrix E, 810. In some embodiments, this is achieved by the row amplifiers 815 driving the row ITOs. The process is repeated sequentially every chip interval $T_k$ for each column of the excitation matrix. The successive chip time intervals are labeled by k=1 to N, where N is equal to the dimension of Hadamard matrix that is just bigger than R, the number of rows. The modulation involves multiplying the row data with a sine-wave signal 825. Preferably, there are an integer number of sine wave cycles per $T_{chip}$. Each column output of the panel 820 is the sum of the row signals affecting the particular column. The $c^{th}$ column signal at the $k^{th}$ chip interval is given by Equation 6 below. Multiplication of excitation matrix E by the carrier sine wave is omitted from this discussion for simplification. The range of c is 1 to N, and if C is less than N, then the panel F is taken as zero for F(:,c), c>C. Similarly, if R is less than N, the panel F is taken as zero for F(r,:), r>R.

$$L(k,c)=F(1,c)*E(1,k)+F(2,c)*E(2,k)+ F(3,c)*E(3,k)+\ldots+F(N,c)*E(N,k) \quad \text{[Eq. 6]}$$

$$L(k,c)=F(r,c)*E(r,k), \text{ summed over } r=1 \text{ to } N$$

$$L(k,c)=E(k,r)*F(r,i), \text{ summed over } r=1 \text{ to } N$$

Using general matrix multiplication notation Y=A*B where element $Y(i,j)=\Sigma[A(i,n)*B(n,j)]$, n=1 to X, $$L=E'*F, \quad \text{[Eq. 7]}$$

where L=L(k,c) is the received column matrix,
E=E(r,k) is the transmitted Excitation matrix, and
F=F(r,c) is the panel mutual capacitance matrix.

The final column signal L is actually obtained by demodulating (multiplying) with the carrier sine wave followed by an integrate-and-dump operation. In order to obtain the panel mutual capacitance matrix F, from Equation 7, $$F=inv(E')*L. \quad \text{[Eq. 8]}$$

The variation in F(r,c) is only 1-5%, so Equation 6 is approximately the column-sum of E for the $c^{th}$ column. Even though E doesn't have a constant column-sum, the dynamic range of the A/D (e.g., after the integrate-and-dump in the prior art, or before the integrate-and-dump as an embodiment of the present invention) can be improved by having the column-sum equal to zero. This is done by subtracting a time varying repeated sequence d(k,1) from the column signal:

$$L2(k,c)=L(k,c)-\text{horzcat}[d(k,1) \text{ 'N' times}]=E'*F-d(k,c),$$

$$L2(k,c)=L(k,c)-d(k,c)=E'*F-d(k,c), \quad \text{[Eq. 9]}$$

where d(k,1)=−sum(E(:,k))
and d(k,c)=horzcat[d(k,1), d(k,1), d(k,1), . . . . d(k,1)] done 'N' times.
From above, $$F=inv(E')*L2-d(k,c)*inv(E')$$

$$F=inv(E')*L2-D(k,c), \text{ where } D(k,c)=d(k,c)*inv(E') \text{ is a constant } N \times N \text{ matrix.}$$

The value of D is not computed directly, since it cancels out in the baseline correction for computing the finger image profile Fp (given below for the $f^{th}$ frame):

$$Fp=F-B \text{ where } B=\text{mean}(F \text{ without finger})$$

$$Fp=(inv(E')*L2-D)-\text{mean}[inv(E')*L2(\text{without finger})-D]$$

$$Fp=inv(E')*L2-\text{mean}[inv(E')*L2(\text{without finger})]. \quad \text{[Eq. 10]}$$

As seen in Equation 10, the finger profile is extracted without actually computing the value of D.

It is noted that the positioning of the A/D (e.g., A/D 837 in FIG. 8) after the integrate-and-dump operation, before the integrate-and-dump operation, as part of the LNA (e.g., LNA 830), or before the LNA, and the usage of digital and/or analog filters in the receiver signal chain to mitigate against interference can be employed within the present invention.

Figure 9A:
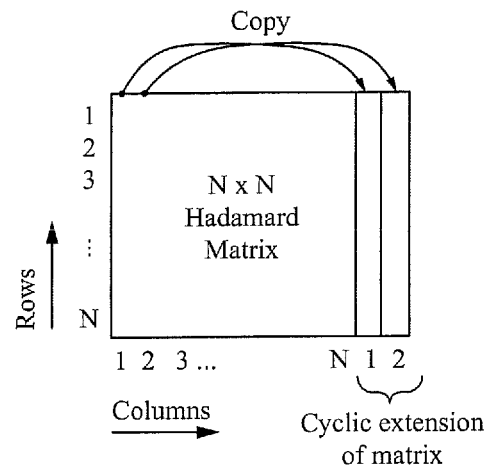
FIG. 9A illustrates one embodiment of an excitation matrix with a cyclic extension in accordance with some embodiments of the present invention.

Additionally, in order to maintain a relative circular shift between rows when viewed in the linear time domain, the present invention preferably employs a circularly appending of a beginning part of each row to its end. FIG. 9A illustrates one embodiment of an excitation matrix, such as an N×N Hadamard matrix or modified Hadamard matrix, with a cyclic extension in accordance with the principles of the present invention. The number of row elements appended should be larger than the equivalent maximum time shift Td over the panel. Therefore, no matter how much phase shift occurs over the column, there is no ISI at a given pixel from any other pixel. In FIG. 9A, the first two row elements are appended to the end of the row for each row. These two appended row elements are a cyclic extension of the matrix. Preferably, the sampled frame for decoding should skip the first Td section from the start of the row excitation burst, so that full circular shifted rows are captured.

Figure 9B:
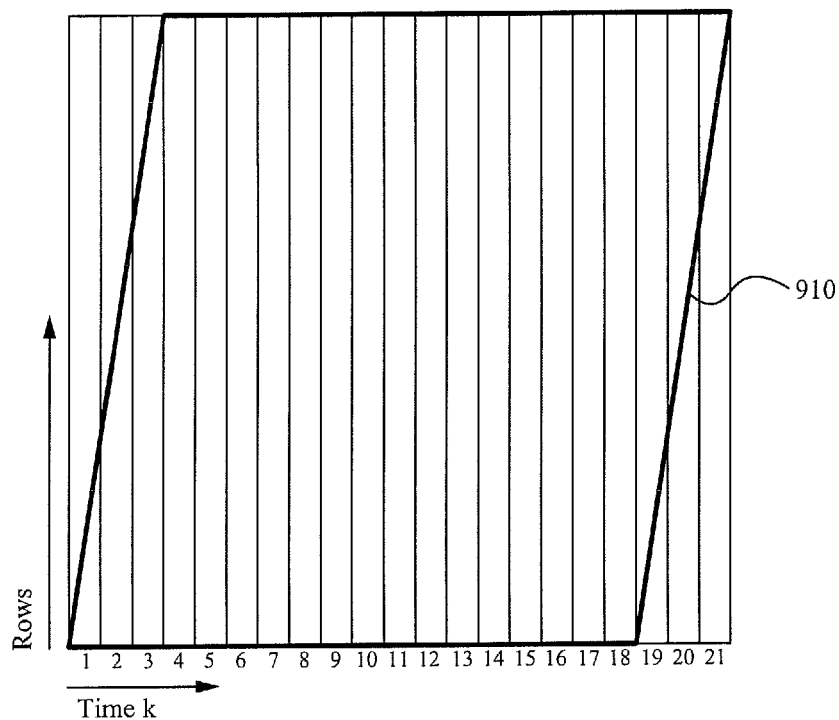
FIG. 9B illustrates one example of how the cyclic extension mitigates phase shift during a scan of a touch panel.

FIG. 9B illustrates one example of how the cyclic extension mitigates phase shift during a scan of a touch panel. In this example, there is a delay of 3 bits. A rectangular excitation matrix is being used. However, the diagonal area 910 is actually what is being sensed at the column output. The delay causes there to be a difference between the excitation matrix being used and what is actually being sensed. In order to compensate for the delay of 3 bits, the first 3 columns of the excitation matrix are appended to the end of it. As seen in FIG. 9B, the excitation matrix has 21 columns (the original 18, plus the additional 3 that have been appended). Without the addition of the first 3 columns to the end of the excitation matrix in the form of columns 19, 20, and 21, the column output would be incomplete. Circularly appending columns to the end of the matrix compensates for this effect of the delay. The column outputs are the sums of the rows, but the rows are relatively shifted in time. Hadamard matrices and modified Hadamard matrices are especially useful here, as they can still be decoded orthogonally under these circumstances. With Hadamard matrices and modified Hadamard matrices, any two rows are orthogonal with any amount of circular shift. The prior art cannot employ the cyclical extension used in the present invention because the prior art does not employ Hadamard matrices or modified Hadamard matrices. As a result, the moment that there is a relative shift of one row to another row, it messes up the decoding completely.

Preferably, a delay is used along with the cyclical extension. Using the example above, you would wait for 3 bits, then start sensing the output of each column. It takes 3 bits for the signal to reach the end of the panel. In this example, you are still processing the same 18 columns. However, you are copying 3 columns and are processing those in order to have a full matrix.

In the prior art, delays are placed in the transmittal for each row. However, this solution is expensive and it requires the generation and storing of the delays, which involves a lot of pre-processing. However, using the Hadamard matrix or modified Hadamard matrix according to the present invention allows you to simply add bits at the end of the rows, as opposed to the prior art's requirement of very precise adjustment of delays.

Figures 10, 11A:
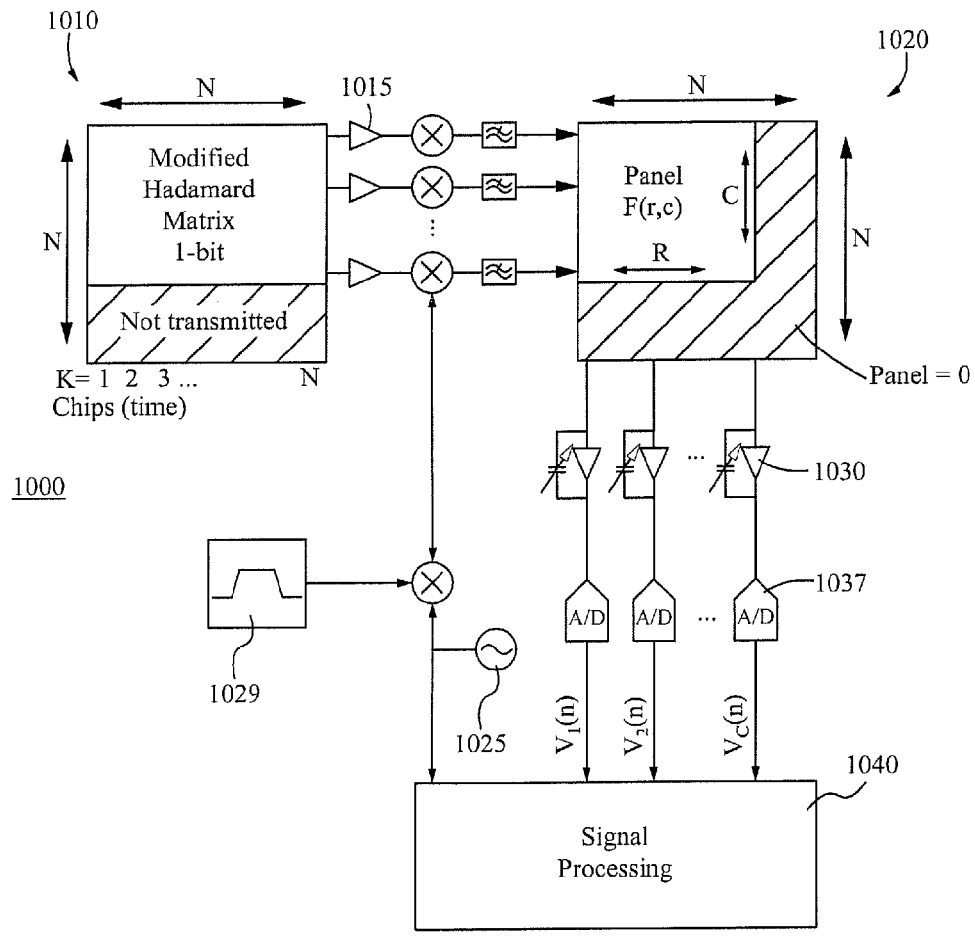
FIG. 10 illustrates another embodiment of a touch screen system in accordance with some embodiments of the present invention.
FIG. 11A illustrates a clustering technique for a touch screen system in accordance with some embodiments of the present invention.

FIG. 10 illustrates another embodiment of a touch screen system 1000 in accordance with some embodiments of the present invention. Touch screen system 1000 is similar to touch screen system 800 in FIG. 8. In touch screen system 1000, excitation matrix E, 1010, excites the rows of mutual capacitance touch panel matrix F, 1020. Excitation matrix E is an orthogonal matrix. Preferably, excitation matrix E comprises a modified Hadamard matrix. In some embodiments, the excitation matrix 1010 comprises an N×N Hadamard matrix or modified Hadamard matrix. In some embodiments, the excitation matrix comprises an orthogonal matrix other than a Hadamard matrix, such as a Walsh matrix. In some embodiments, this orthogonal matrix other than a Hadamard matrix is dot multiplied with a cover code to form a modified orthogonal matrix, similar to how the modified Hadamard matrix is produced.

In one example, touch panel 1020 has 18 drive channels and 16 sense columns. Preferably, the order, N, of the excitation matrix 1010 is greater than or equal to the larger of the number of drive channels (here, 18), and the number of sense columns (here, 16). In some embodiments, the modified Hadamard matrix has order 1, 2, or 4k where k is an integer greater than zero. In this example, the lowest order, N, for a modified Hadamard excitation matrix 1010 meeting the foregoing criteria is N=20. For each column, $C_i$, of the modified Hadamard excitation matrix 1010, the column is selected, each drive signal is fed to an amplifier 1015, and the amplified selected column is preferably mixed with a sine wave 1025 (e.g., a 100 KHz sine) to produce a drive signal for each of the drive channels of the touch panel 1020. In some embodiments, each drive signal is filtered by a filter before feeding the drive signal to a drive channel of the touch panel 1020. In some embodiments, a windowing function 1029 is used in the transmitter either at each chip or at full frame durations to reduce ISI from the system equivalent channel response.

In alternative embodiments, a cover code is dot multiplied with a Hadamard matrix downstream from the amplifiers 1015 and upstream from the panel 1020, as opposed to the cover code being used to form the modified Hadamard matrix as the excitation matrix 1010. In some embodiments, the cover code is a vector of order N. The coefficients of the cover code vector are able to be 1-bit values, integers, real values, or complex values. In some embodiments, this cover code, multiplied by the sine wave 1025, is also fed to the each column sense channel or to the signal processing unit 1040 for demodulation.

For the example touch panel 1020, there are 18 drive channels and the modified Hadamard excitation matrix 1010 has order 20. Thus, each selected column of the modified Hadamard excitation matrix 1010 has 20 coefficients. The last two coefficients of a selected column of the modified Hadamard excitation matrix 1010 are not transmitted to the touch panel 1020 because there is no corresponding drive channel (e.g. 19 and 20) on the touch panel 1020. Conceptually, the physical touch panel 1020 exists within an N×N matrix having null values for rows greater than the touch panel 1020 (here, rows 19 and 20) and null values for columns greater than the touch panel 1020 (here, columns 17 through 20). Each column sense is input to an amplifier 1030. The output of the amplifier 1030 is then fed to an A/D 1037.

One particularly beneficial feature of the present invention is the digitization at the output of the low noise amplifier 1030 for each column. In some embodiments, a dedicated A/D is used for each column. In some embodiments, full or partial multiplexing of column signals is employed, using fewer A/Ds. As a result of the digitization at the output of the amplifiers 1030, signal processing 1040 can be performed in the receiver's digital domain. Signal processing 1040 can include any implementation of the processing performed downstream of amplifiers 830 in FIG. 8. Positioning the A/Ds directly to the amplifier outputs is especially useful in enabling phase adjustment, such as delays, to be configured digitally as opposed to using analog configurations of delays, which are expensive. Accurate phase adjustments do not create ICI due to cyclically shifted orthogonal codes. It only reduces the amplitude slightly, which only affects the S/N marginally.

The present invention provides a means to eliminate the gain reduction of the down converter when the rows and columns suffer significant phase shift. The digitization discussed above is particularly useful in employing region-specific delays. Each pixel can be demodulated independently by using its own code to despread the output of the column, but you have to have the appropriate delay in the dispreading signal to match the delay of the panel. However, you do not need a delay for each pixel. Instead, you can have a delay for clusters, thereby simplifying the signal processing.

Although the digital implementation of the correlator and integrator discussed above is beneficial, it is contemplated that the present invention can also employ analog implementation of the correlator and integrator.

FIG. 11A illustrates a clustering technique for a touch screen system in accordance with some embodiments of the present invention. The panel area is divided into 2-dimensional clusters that have negligible phase shifts over each cluster. The panel in FIG. 11A has 6 cluster regions (labeled #'s 1 through 6). Each cluster region has a corresponding delay. So, to decode pixels in cluster region 1, the corresponding delay of cluster region 1 is used. To decode pixels in cluster region 2, the corresponding delay of cluster region 2 is used. And so on. Referring back to the cyclical extension previously discussed, the Hadamard excitation matrix or modified Hadamard matrix is preferably extended by an amount larger than the maximum panel delay $\Delta t_i$, where $\Delta t_i = \Delta \theta_i / 2\pi f_T$, i=cluster number, $f_T$=carrier frequency, and $\Delta \theta_i$=mean cluster signal phase shift relative to carrier.

In some embodiments, the down conversion is done digitally and separately for each cluster with a corresponding fixed phase offset of the local oscillator. The signal is preferably digitized prior to the down conversion. The integrate-and-dump can also be employed digitally with corresponding timing for each cluster.

Figure 11B:
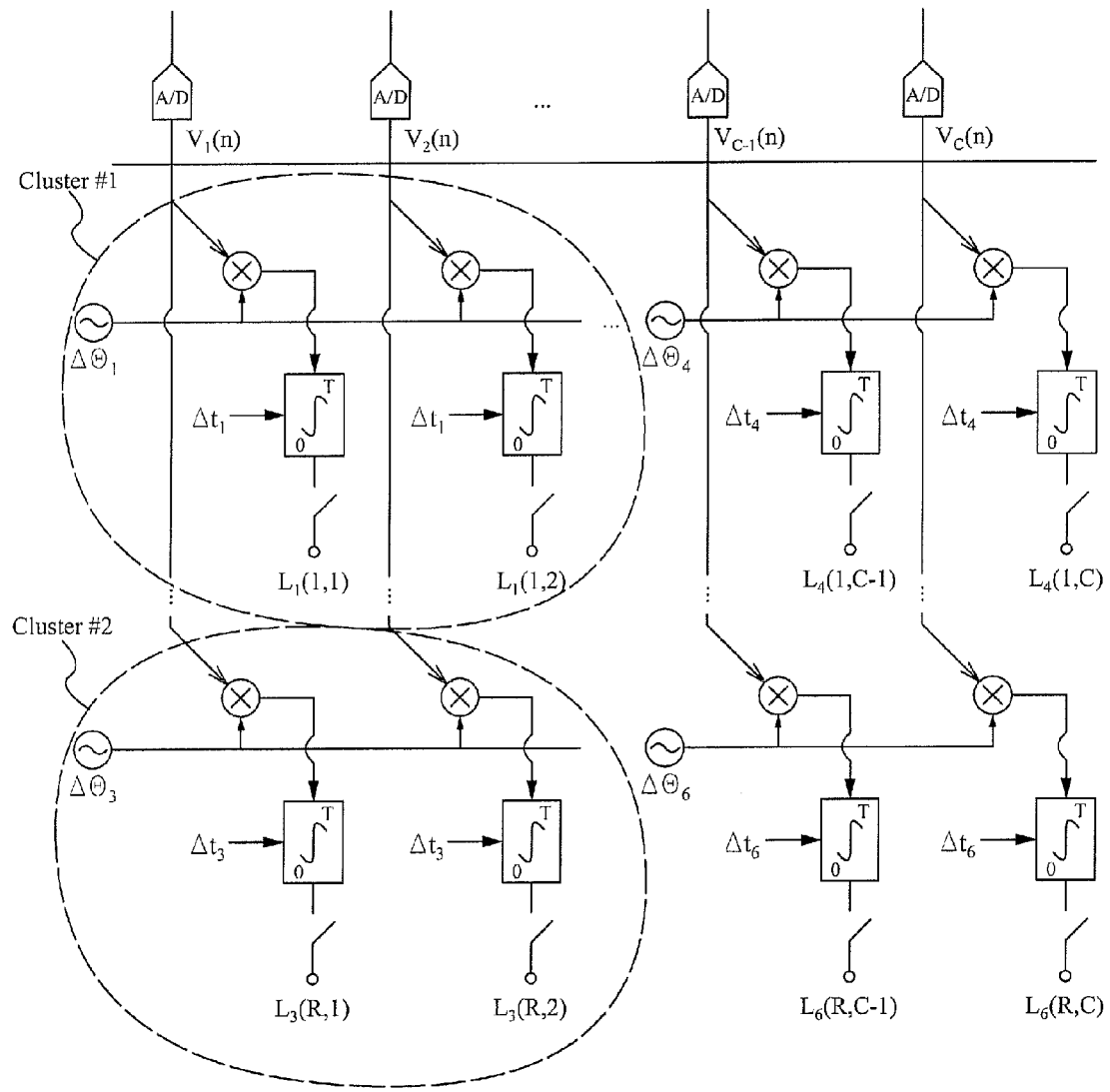
FIG. 11B is a schematic diagram illustrating one embodiment of an implementation of the clustering technique in accordance with some embodiments of the present invention.

FIG. 11B is a schematic diagram illustrating one embodiment of an implementation of the clustering technique in accordance with some embodiments of the present invention. Each cluster is a region of selected rows and columns, and each cluster is decorrelated with a region-specific phase shift of a local oscillator. In some embodiments, this decorrelation is followed by a regular integrate-and-dump operation with a suitably aligned clock (or data block) that is specific to that region. In some embodiments, the L matrix (or the L2 matrix of the present invention shown in FIG. 8) is recomposed using clustered matrices $L_1, L_2, \ldots L_n$. In some embodiments, each clustered sub-matrix $L_i$ is processed with a sub-inverse-matrix for decoding.

Using a Hadamard excitation matrix or modified Hadamard matrix, the output at the sense channels is not substantially constant across all sense channels in certain situations when no touch is present upon the touch panel. The previously mentioned cover code, which is a constant vector, can be used to bring the column sense channel outputs to a substantially constant voltage. Then, the constant voltage is able to be used as an offset to bring all sense channel voltages to substantially zero when no touch is present upon the touch panel. Thus, the dynamic range required for LNAs at the sense channels, and associated A/Ds receiving the output of the LNAs, can be reduced over the prior art. Using the present invention, a touch panel controller can be made that is smaller, uses less power, generates less heat, and has a lower cost over the prior art.

In some embodiments, the coefficients of the cover code are one of −1, +1, and 0 such that the cover code can be encoded as a single binary value. In some embodiments, the coefficients of the cover code are real-valued, complex-valued, or a combination thereof.

In some embodiments, the cover code is a vector of M coefficients for a touch panel having M drive channels. The coefficients of the cover code are preferably chosen such that the output voltages, V, received at the sense channels of the touch panel are all substantially the same when there is no touch upon the touch panel. In some embodiments, an offsetting corrective voltage, −V, is then injected at all sense channels so that the sense channels all report a voltage that is substantially zero when there is no touch upon the touch panel. This property of the cover code enables the use of LNAs at the sense channels that have smaller dynamic range over the prior art. The benefit of LNAs with a smaller dynamic range is that the LNAs of the present invention can be lower cost, smaller, use less power, generate less heat, and require fewer bits in an associated A/D over the prior art.

In some embodiments, the present invention comprises time-varying DC cancellation to make the row-sum equal zero. In some embodiments, the present invention comprises injecting an offset voltage to the output of each sense channel such that the voltage output at all sense channels is substantially the same when no touch is made upon the touch panel. In some embodiments, injecting an offset voltage to the output of each sense channel comprises injecting a voltage that varies with the selection of the $i^{th}$ excitation matrix column $C_i$. In some embodiments, injecting an offset voltage comprises injecting the offset voltage at a point after a sense channel amplifier and before a sense channel integrator. In some embodiments, injecting an offset voltage comprises injecting a constant voltage for all sense channels. In some embodiments, the present invention employs offset cancellation via suitable DC injection at the integrator input that is connected to the correlator output in the receiver. This injection point is a more suitable place for offset cancellation since the integrator is more prone to signal overload compared to the sense amplifier. In some embodiments, the offset cancellation code is individualized for each sensor, i.e., tweaked for each particular sensor for complete cancellation. In some embodiments, the offset cancellation code is individualized for mean response of panel variation.

It is contemplated that the present invention can incorporate features from U.S. Patent Application Publication Number 2010/0060593 to Krah, filed Sep. 10, 2008, and entitled "Phase Compensation for Multi-Stimulus Controller," the contents of which are hereby incorporated by reference in their entirety as if set forth herein. For example, in some embodiments, the present invention employs a sine wave lookup table for the row-drive waveform, as disclosed in Krah, instead of using memory to save the waveform, in order to save memory and chip area. Additionally, Krah describes how to mitigate panel phase shifts by modifying the inverse matrix appropriately in the decoding process. In some embodiments, the present invention incorporates this modified inverse matrix decoding method. As discussed above with respect to FIGS. 11A-B, in some embodiments of the present invention, the panel is broken down into clusters. In some embodiments, a modified inverse matrix is used for each cluster. However, it is noted that the present invention's previously discussed application of appropriate delays per row-drive to compensate for panel delays, such as discussed with respect to FIGS. 11A-B, is better for S/N compared to the modified inverse matrix method. With the modified inverse matrix method, the S/N will degrade by an amount of panel gain reduction equal to $1/\cos \theta$, where $\theta$ is the correlator phase alignment for a given pixel and is the uncorrected phase when going over a column ITO.

The following co-pending patent applications describe features related to the present application and are hereby incorporated by reference in their entirety as if set forth herein: "HADAMARD MATRIX BASED PROJECTED MUTUAL CAPACITANCE TOUCH PANEL DECODING," by Rishi Mohindra, filed concurrently with the present application, having U.S. patent application Ser. No. 13/480,357, and "DIGITAL FILTERING AND SPREAD SPECTRUM BASED INTERFERENCE MITIGATION FOR MUTUAL AND SELF CAPACITANCE PANEL," by Rishi Mohindra, filed concurrently with the present application, being U.S. patent application Ser. No. 13/480,414. It is contemplated that any of the features described within these co-pending patent applications can be incorporated into the present invention.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications can be made in the embodiment chosen for illustration without departing from the spirit and scope of the invention as defined by the claims.

What is claimed is:

1. A touch screen controller for a mutual capacitance touch screen panel having a plurality of row conductors intersecting with a plurality of column conductors to form a matrix of pixels, each pixel configured to have a mutual capacitance, the touch screen controller comprising:
   a transmitting unit configured to drive the row conductors with row drive signals formed from an excitation matrix, wherein each row in the excitation matrix is orthogonal to every other row in the excitation matrix, wherein the excitation matrix includes a cyclic extension at the end of each row, the cyclic extension for each row repeating a sequence of elements taken in order from a beginning portion of the row, and wherein the excitation matrix has a dimension larger than the matrix of pixels and is a modified Hadamard matrix that is a dot product of a Hadamard matrix with a cover code matrix, the cover code matrix determined by comparing absolute values of columns summed over non-zero rows of the matrix of pixels; and
   a receiving unit configured to sense signals from the column conductors and to determine the mutual capacitance of the pixels using the sensed signals and an inverse of the excitation matrix.

2. The touch screen controller of claim 1, wherein the sequence of elements includes a predetermined number of elements that is larger than a maximum panel delay of the touch screen panel.

3. The touch screen controller of claim 1, wherein determining the mutual capacitance of the pixels comprises:
   receiving clusters of signals, wherein each signal in the clusters of signals is formed from one of the sensed signals, and each cluster of signals corresponds to a different region of pixels on the touch screen panel; and
   applying a different region-specific phase shift to each cluster of signals.

4. The touch screen controller of claim 3, wherein the receiving unit comprises one or more analog-to-digital converters configured to convert analog signals received from the column conductors into digital signals that form the clusters of signals prior to the application of the different region-specific phase shifts to the cluster of signals.

5. The touch screen controller of claim 4, wherein the receiving unit comprises low-noise amplifiers configured to amplify analog signals received from the column conductors and to provide the amplified analog signals to the one or more analog-to-digital converters.

6. The touch screen controller of claim 1, wherein the transmitting unit is further configured to form the row drive signals by pulse shaping row elements of the excitation matrix.

7. The touch screen controller of claim 6, wherein the transmitting unit is configured to pulse shape the row elements of the excitation matrix with a sinusoidal waveform.

8. The touch screen controller of claim 7, wherein the sinusoidal waveform is provided by a sine wave lookup table.

9. The touch screen controller of claim 6, wherein the transmitting unit is configured to pulse shape the row elements of the excitation matrix using a raised-cosine filter.

10. The touch screen controller of claim 1, wherein the transmitting unit is configured to use a window function in forming the row drive signals.

11. The touch screen controller of claim 1, wherein the receiving unit is configured to use a window function in determining the mutual capacitance of the pixels.

12. A method of mitigating a phase shift in a mutual capacitance touch screen panel having a plurality of row conductors intersecting with a plurality of column conductors to form a matrix of pixels, each pixel configured to have a mutual capacitance, the method comprising:
   driving the row conductors with row drive signals formed from an excitation matrix, wherein each row in the excitation matrix is orthogonal to every other row in the excitation matrix, wherein the excitation matrix includes a cyclic extension at the end of each row, the cyclic extension for each row repeating a sequence of elements taken in order from a beginning portion of the row, and wherein the excitation matrix has a dimension larger than the matrix of pixels and is a modified Hadamard matrix that is a dot product of a Hadamard matrix with a cover code matrix, the cover code matrix determined by comparing absolute values of columns summed over non-zero rows of the matrix of pixels, the cover code matrix including entries with a value of +1 for unused rows of the matrix of pixels;
   sensing signals from the column conductors; and
   determining the mutual capacitance of the pixels using the sensed signals and an inverse of the excitation matrix.

13. The method of claim 12, wherein the sequence of elements includes a predetermined number of elements that is larger than a maximum panel delay of the touch screen panel.

14. The method of claim 12, wherein determining the mutual capacitance of the pixels comprises:
   receiving clusters of signals, wherein each signal in the clusters of signals is formed from one of the sensed signals, and each cluster of signals corresponds to a different region of pixels on the touch screen panel; and
   applying a different region-specific phase shift to each cluster of signals.

15. The method of claim 14, further comprising converting analog signals received from the column conductors into digital signals that form the clusters of signals prior to applying the different region-specific phase shifts to the cluster of signals.

16. The method of claim 15, further comprising:
   amplifying analog signals received from the column conductors using low-noise amplifiers; and
   providing the amplified analog signals to analog-to-digital converters for the conversion into the digital signals that form the clusters of signals.

17. The method of claim 12, further comprising forming the row drive signals by pulse shaping row elements of the excitation matrix.

18. The method of claim 17, further comprising pulse shaping the row elements of the excitation matrix with a sinusoidal waveform.

19. The method of claim 18, wherein the sinusoidal waveform is provided by a sine wave lookup table.

20. The method of claim 17, further comprising pulse shaping the row elements of the excitation matrix using a raised-cosine filter.

21. The method of claim 12, further comprising using a window function in forming the row drive signals.

22. The method of claim 12, further comprising using a window function in determining the mutual capacitance of the pixels.

23. A non-transitory program storage device readable by a machine, tangibly embodying a program of instructions executable by the machine to mitigate a phase shift in a touch screen panel having a plurality of row conductors intersecting with a plurality of column conductors to form a matrix of pixels, each pixel configured to have a mutual capacitance, the program of instructions comprising executable instructions to:
  drive the row conductors with row drive signals formed from an excitation matrix, wherein each row in the excitation matrix is orthogonal to every other row in the excitation matrix, wherein the excitation matrix includes a cyclic extension at the end of each row, the cyclic extension for each row repeating a sequence of elements taken in order from a beginning portion of the row, and wherein the excitation matrix has a dimension larger than the matrix of pixels and is a modified Hadamard matrix that is a dot product of a Hadamard matrix with a cover code matrix, the cover code matrix being based upon determining a minimum absolute value for absolute values of columns summed over non-zero rows of the matrix of pixels; and
  determine the mutual capacitance of the pixels using signals sensed from the column conductors and an inverse of the excitation matrix.

24. The non-transitory program storage device of claim 23, wherein the sequence of elements includes a predetermined number of elements that is larger than a maximum panel delay of the touch screen panel.

25. The non-transitory program storage device of claim 23, wherein the executable instructions to determine the mutual capacitance of the pixels comprise executable instructions to:
  receive clusters of signals, wherein each signal in the clusters of signals is formed from one of the sensed signals, and each cluster of signals corresponds to a different region of pixels on the touch screen panel; and
  apply a different region-specific phase shift to each cluster of signals.

26. The non-transitory program storage device of claim 23, wherein the program of instructions tangibly embodied by the non-transitory program storage device further comprises executable instructions to form the row drive signals by pulse shaping row elements of the excitation matrix.

27. The non-transitory program storage device of claim 26, wherein the program of instructions tangibly embodied by the non-transitory program storage device further comprises executable instructions to pulse shape the row elements of the excitation matrix with a sinusoidal waveform.

28. The non-transitory program storage device of claim 27, wherein the sinusoidal waveform is provided by a sine wave lookup table.

29. The non-transitory program storage device of claim 26, wherein the program of instructions tangibly embodied by the non-transitory program storage device further comprises executable instructions to pulse shape the row elements of the excitation matrix using a raised-cosine filter.

30. The non-transitory program storage device of claim 23, wherein the program of instructions tangibly embodied by the non-transitory program storage device further comprises executable instructions to form the row drive signals using a window function.

31. The non-transitory program storage device of claim 23, wherein the program of instructions tangibly embodied by the non-transitory program storage device further comprises executable instructions to determine the mutual capacitance of the pixels using a window function.

32. The touch screen controller of claim 1, wherein the cover code matrix comprises a repeating N×1 column vector, and wherein the cover code matrix has the same dimensions as the Hadamard matrix.

33. The method of claim 12, wherein the cover code matrix comprises a repeating N×1 column vector, and wherein the cover code matrix has the same dimensions as the Hadamard matrix.

34. The non-transitory program storage device of claim 23, wherein the cover code matrix comprises a repeating N×1 column vector, and wherein the cover code matrix has the same dimensions as the Hadamard matrix.

* * * * *